US00RE40199E

(19) United States
(12) Reissued Patent
Sugimoto et al.

(10) Patent Number: US RE40,199 E
(45) Date of Reissued Patent: Apr. 1, 2008

(54) FUEL INJECTION VALVE FOR AN INTERNAL COMBUSTION ENGINE

(75) Inventors: Tomojiro Sugimoto, Susono (JP); Keiso Takeda, Mishima (JP)

(73) Assignee: Toyota Jidosha Kabushiki Kaisha, Toyota-shi (JP)

(21) Appl. No.: 10/878,685

(22) Filed: Jun. 29, 2004

Related U.S. Patent Documents

Reissue of:
(64) Patent No.: 6,089,476
Issued: Jul. 18, 2000
Appl. No.: 09/094,156
Filed: Jun. 9, 1998

(30) Foreign Application Priority Data

Jun. 24, 1997 (JP) ..... 9-167629
Nov. 12, 1997 (JP) ..... 9-310500

(51) Int. Cl.
*B05B 1/00* (2006.01)
*B05B 1/30* (2006.01)
*F02M 59/00* (2006.01)
*F02M 61/00* (2006.01)

(52) U.S. Cl. ..... 239/596; 239/88; 239/533.2; 239/533.12; 239/585.1; 239/585.3; 239/585.4; 239/585.5

(58) Field of Classification Search ..... 239/596, 239/533.12, 533.2, 88, 89, 585.1, 585.3, 239/585.4, 585.5; 123/525, 527; 251/129.15, 251/129.21, 118, 127
See application file for complete search history.

(56) References Cited

U.S. PATENT DOCUMENTS 2,382,151 A 8/1945 Harper
4,057,190 A * 11/1977 Kiwior et al. ..... 239/558
4,621,772 A * 11/1986 Blythe et al. ..... 239/533.12
4,646,974 A 3/1987 Sofianek et al.
4,865,001 A * 9/1989 Jensen ..... 123/525
5,329,908 A * 7/1994 Tarr et al. ..... 123/527
5,577,481 A 11/1996 Wahba

FOREIGN PATENT DOCUMENTS

| | | | |
|---|---|---|---|
| DE | 32 29 716 A1 | | 2/1984 |
| DE | 197 47 143 A1 | | 4/1998 |
| DE | 198 27 220 A1 | | 1/1999 |
| EP | 0 740 071 A2 | | 10/1996 |
| GB | 400836 | * | 11/1933 |
| GB | 1214595 | * | 12/1970 |
| JP | 58-1905568 | * | 11/1983 |
| JP | 61-135979 | * | 6/1986 |
| JP | 3-117672 | * | 9/1989 |
| JP | 7-127550 | * | 5/1995 |
| JP | 9-32695 | * | 2/1997 |

* cited by examiner

*Primary Examiner*—Davis D. Hwu
(74) *Attorney, Agent, or Firm*—Kenyon & Kenyon LLP

(57) ABSTRACT

A fuel jet adjusting plate has first nozzle holes arranged along a first circle coaxial with a central axis of a valve body and second nozzle holes arranged along a second circle coaxial with the central axis and having a diameter larger than that of the first circle. Each hole axis of the second nozzle holes forms an acute angle with a reference plane perpendicular to the central axis of the valve body smaller than that formed by each hole axis of the first nozzle holes with the reference plane. Hence, fuel sprays injected through the first nozzle holes can be directed away from fuel sprays injected through the second nozzle holes. As a result, the fuel sprays injected through the first nozzle holes do not interfere with the fuel sprays injected through the second nozzle holes, which makes it possible to suitably atomize injected fuel.

6 Claims, 14 Drawing Sheets

FUEL INJECTION VALVE FOR AN INTERNAL COMBUSTION ENGINE

Matter enclosed in heavy brackets [ ] appears in the original patent but forms no part of this reissue specification; matter printed in italics indicates the additions made by reissue.

INCORPORATION BY REFERENCE

The disclosure of Japanese Patent Application No. HEI 9-310500 filed on Nov. 12, 1997 (the convention application: Japanese Patent Application No. HEI 9-167629 with a priority date of Jun. 24, 1997) including the specification, drawings and abstract is incorporated herein by reference in its entirety.

FIELD OF THE INVENTION

The present invention relates to a fuel injection valve for an internal combustion engine.

BACKGROUND OF THE INVENTION

Conventionally known fuel injection valves for an internal combustion engine have been provided with nozzle holes whose hole axes form a predetermined angle with a plane perpendicular to a central axis of a valve body. This type of fuel injection valve is disclosed, for example, in Japanese Patent Application Laid-Open No. HEI 7-127550. Based on this art wherein a fuel jet adjusting plate has nozzle holes of which all the hole axes form a predetermined angle with the plane perpendicular to the central axis the nozzle holes may be arranged along two circles or more coaxial with the central axis.

FIG. 16 is a partial plan view of a conventional fuel injection valve for an internal combustion engine, illustrating the fuel jet adjusting plate where, based on the aforementioned art, the nozzle holes are arranged along two circles coaxial with the central axis. Referring to FIG. 16, reference characters H1' to H12' denote nozzle holes, C1' a first circle coaxial with the valve body and along which the nozzle holes H1' to H8' are arranged. C2' a second circle coaxial with the valve body and along which the nozzle holes H9' to H12' are arranged, and L0' the central axis. The second circle C2' has a diameter smaller than that of the first circle C1'. FIG. 17 is a sectional view taken along line XVII—XVII in FIG. 16. In FIG. 17, a plane perpendicular to the central axis L0' is defined as a reference plane SB'. A cross section shown in FIG. 17 consists of a plane S0' perpendicular to the reference plane SB' and including the central axis L0', a plane S10' perpendicular to the reference plane SB' and including a hole axis L10' of the nozzle hole H10', and a plane S3' perpendicular to the reference plane SB' and including a hole axis L3' of the nozzle hole H3'. Referring to FIG. 17, reference characters F10', F3' denote fuel sprays injected through the nozzle holes H10', H3' respectively. The hole axis L3' forms an acute angle a3' with the reference plane SB', and the hole axis L10' forms an acute angle a10' with the reference plane SB'. As can be seen from FIG. 17, the acute angle a3' is equal to the acute angle a10'. Although not shown, hole axes L1' to L12' form acute angles a1' to a12' respectively, with the reference plane SB' and all these acute angles a1' to a12' assume an equal value.

As illustrated in FIG. 17, however, the fuel sprays F3', F10' injected through the nozzle holes H3', H10' are diffused and thus interfere with each other. In this case, the fuel sprays F3', F10' become unstable, which makes it impossible to suitably atomize injected fuel.

SUMMARY OF THE INVENTION

The present invention has been devised in consideration of the aforementioned problems. It is thus an object of the present invention to provide a fuel injection valve for an internal combustion engine that is capable of preventing fuel sprays injected through nozzle holes arranged along a plurality of concentric circles from interfering with each other, thereby stabilizing the respective fuel sprays, and suitably atomizing the injected fuel.

In order to achieve the aforementioned object, a first aspect of the present invention provides a fuel injection valve for an internal combustion engine including a valve body driven by driving means between an open position and a closed position, a fuel jet adjusting plate for atomizing fuel injected when the valve body assumes the open position, a plurality of first nozzle holes arranged along a first circle that is located on the fuel jet adjusting plate and coaxial with a central axis of the valve body, and a plurality of second nozzle holes arranged along a second circle concentric with the first circle and having a diameter larger than that of the first circle, wherein each hole axis of the second nozzle holes forms second acute angle with a plane perpendicular to the central axis and each hole axis of the first nozzle holes forms a first acute angle with the plane perpendicular to the central axis which is larger than the second acute angle.

In a second aspect of the present invention, the fuel injection valve according to the first aspect may be provided in an intake port in order to inject and atomize fuel such that the fuel reaches a combustion chamber at a timing at which an intake valve assumes its open position. In this case, fuel sprays injected through the first and second nozzle holes do not reach a central portion of a mushroom-shaped portion of the intake valve but only an outer periphery of the mushroom-shaped portion.

In a third aspect of the present invention, the fuel injection valve according to the second aspect may be constructed such that the first nozzle holes have an opening area different from that of the second nozzle holes.

According to the first aspect of the present invention, the hole axis of the second nozzle holes form an acute angle with the plane perpendicular to the central axis of the valve body which is smaller than that formed by the hole axes of the first nozzle holes with the aforementioned plane. Thus, the fuel sprays injected through the second nozzle holes can be directed away from the fuel sprays injected through the first nozzle holes. In this case, it is possible to prevent the fuel sprays injected through the second nozzle holes from interfering with the fuel sprays injected through the first nozzle holes. As a result, the respective fuel sprays can be stabilized, which makes it possible to suitably atomize injected fuel.

According to the second aspect of the present invention, since the fuel injected from the fuel injection valve does not adhere to the central portion of the mushroom-shaped portion of the intake valve, no delay is caused in supplying fuel to the combustion chamber. Hence, it is possible to improve response in a transient operating state of an internal combustion engine.

According to the third aspect of the present invention, the fuel injection valve can be constructed, if necessary, such that the first nozzle holes have an opening area different from that of the second nozzle holes. Thus, fuel entering the combustion chamber can be suitably distributed, whereby it is possible to make air-fuel mixture homogeneous, preclude incomplete combustion by less densely distributing fuel on the side of an ignition plug, or causing lean fuel to burn by more densely distributing fuel on the side of the ignition plug.

BRIEF DESCRIPTION OF THE DRAWINGS

Further objects, features and advantages of the present invention will become apparent from the following description of preferred embodiments with reference to the accompanying drawings, wherein.

DESCRIPTION OF PREFERRED EMBODIMENTS

Preferred embodiments of the present invention will now be described with reference to the accompanying drawings.

Figure 1:
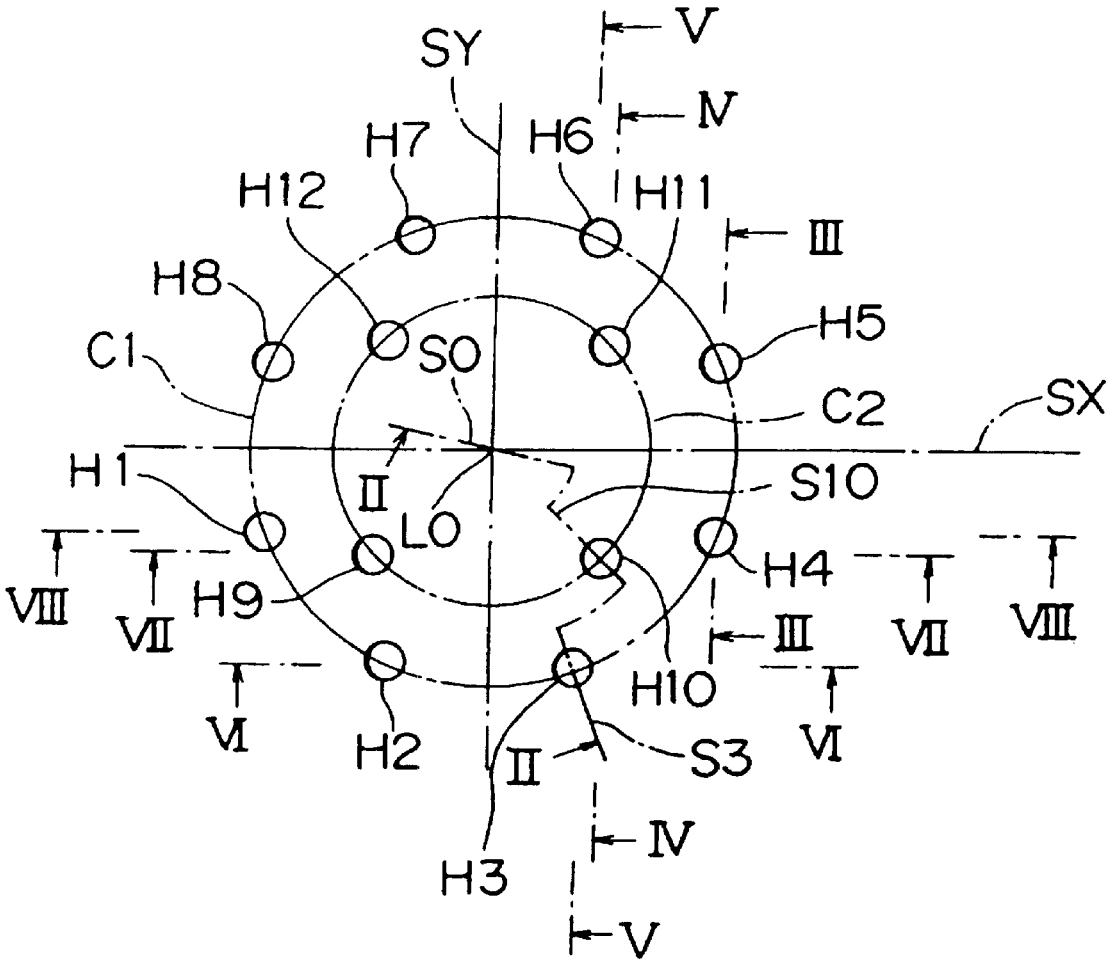
FIG. 1 is a partial plan view of a fuel jet adjusting plate of a fuel injection valve for an internal combustion engine according to a first embodiment of the present invention, illustrating a section where nozzle holes are formed.

FIG. 1 is a partial plan view of a fuel jet adjusting plate of a fuel injection valve for an internal combustion engine according to a first embodiment of the present invention, illustrating a section where nozzle holes are formed. Referencing to FIG. 1, reference characters H1 to H12 denote nozzle holes, C1 a first circle coaxial with a valve body, C2 a second circle also coaxial with the valve body and having a diameter smaller than that of the first circle C1', L0 a central axis of the valve body. As illustrated in FIG. 1, the nozzle holes H1 to H8 are arranged along the first circle C1 at predetermined intervals and the nozzle holes H9 to H12 are arranged along the second circle C2 at predetermined intervals.

Figure 2:
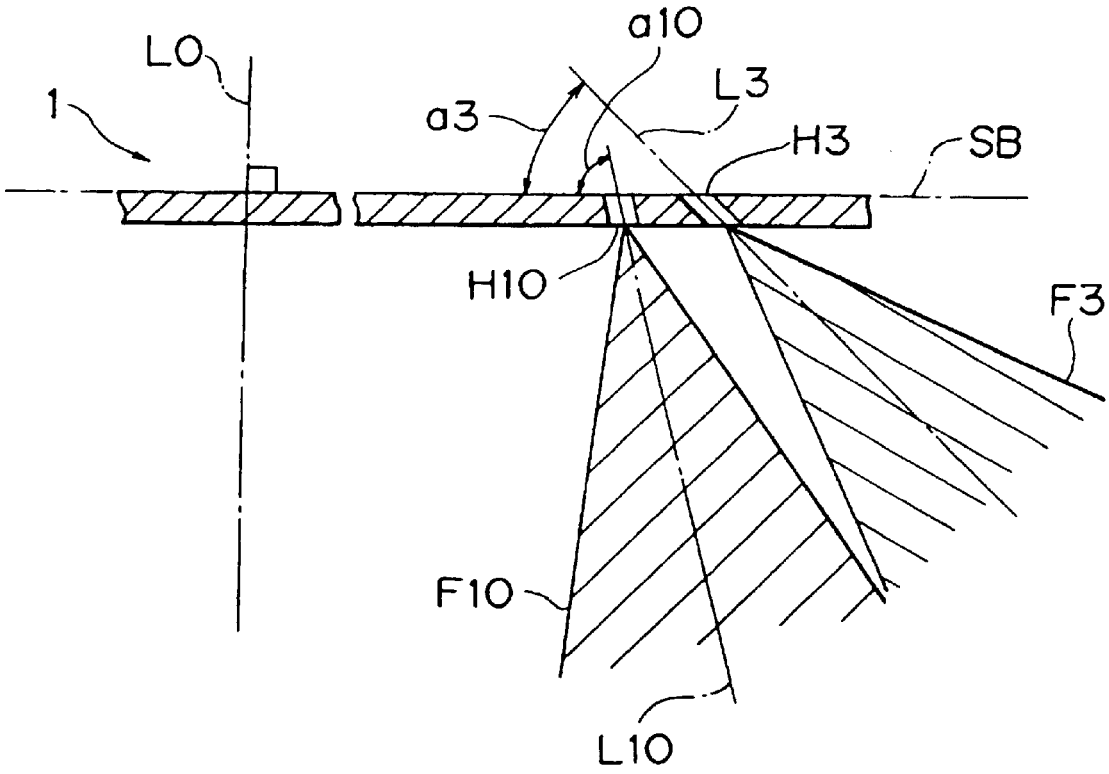
FIG. 2 is a sectional view taken along line II—II in FIG. 1.

FIG. 2 is a sectional view taken along line II—II in FIG. 1. In FIG. 2, a plane perpendicular to the central axis L0 of the valve body is defined as a reference plane SB. As can be seen from FIGS. 1 and 2, a cross section shown in FIG. 2 consists of a plane S0 that is perpendicular to the reference plane SB and includes the central axis L0, a plane S10 that is perpendicular to the reference plane SB and includes a hole axis L10 of the nozzle hole H10, and a plane S3 that is perpendicular to the reference plane SB and includes a hole axis L3 of the nozzle hole H3. A fuel jet adjusting plate 1 has the shape of a slab. The valve body (not shown) disposed upstream of the fuel jet adjusting plate 1 is driven by driving means (not shown) between an open position and a closed position. When the valve body is opened, the fuel jet adjusting plate 1 atomizes fuel injected through the nozzle holes H1 to H12.

In this embodiment, hole axis L1 to L8 of the nozzle holes H1 to H8 form acute angles a1 to a8 respectively, with the reference plane SB and hole axes L9 to L12 of the nozzle holes H9 to H12 form acute angles a9 to a12, respectively with the reference plane SB. Although FIG. 2 illustrates only the acute angles a3 and a10, the acute angle a1 to a8 are also smaller than the acute angles a9 to a12. Thus, fuel sprays F1 to F8 injected through the nozzle holes H1 to H8 and fuel sprays F9 to F12 injected through the nozzle holes H9 to H12 are directed away from each other. Therefore, the fuel sprays F1 to F8 injected through the nozzle holes H1 to H8 do not interfere with the fuel sprays F9 to F12 injected through the nozzle holes H9 to H12. As a result, it is possible to stabilize the respective fuel sprays and suitably atomize the fuel thus injected. In addition, despite the fact fuel pressures near inlet portions of the nozzle holes H1 to H8 are lower than fuel pressures near inlet portions of the nozzle holes H9 to H12, the fuel sprays F1 to F8 injected through the nozzle holes H1 to H8 can suitably be atomized. This is because the acute angles a1 to a8 are smaller than the acute angles a9 to a12.

Figure 3:
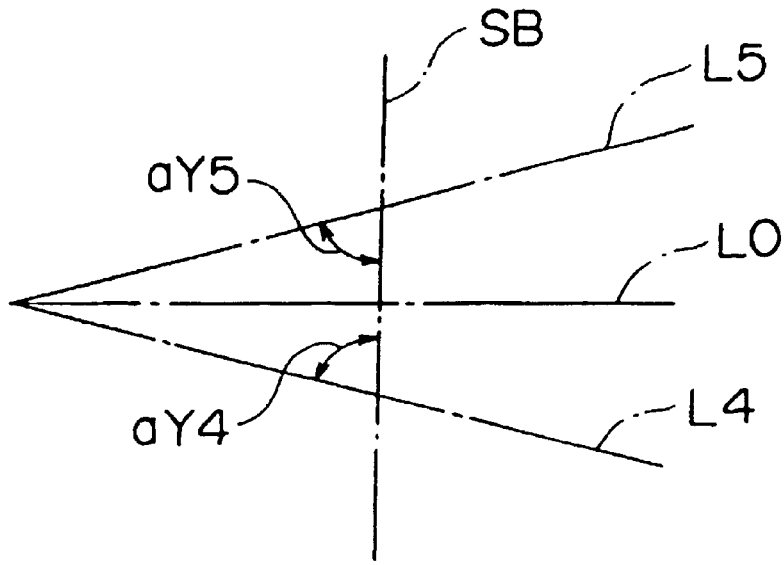
FIG. 3 is a projected view illustrating hole axes L5, L4 of nozzle holes H5, H4 projected onto a plane SY.
Figure 4:
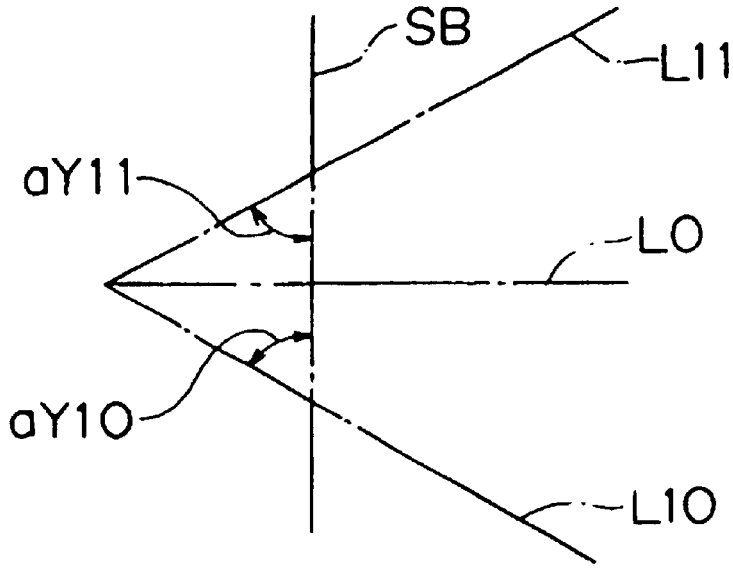
FIG. 4 is a projected view illustrating hole axes L11, L10 of nozzle holes H11, H10 projected onto the plane SY.
Figure 5:
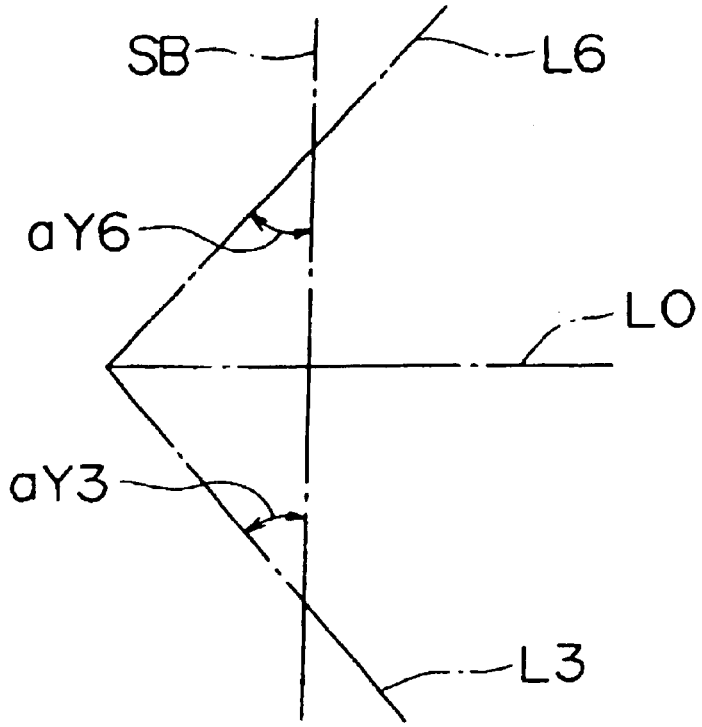
FIG. 5 is a projected view illustrating hole axes L6, L3 of nozzle holes H6, H3 projected onto the plane SY.
Figure 6:
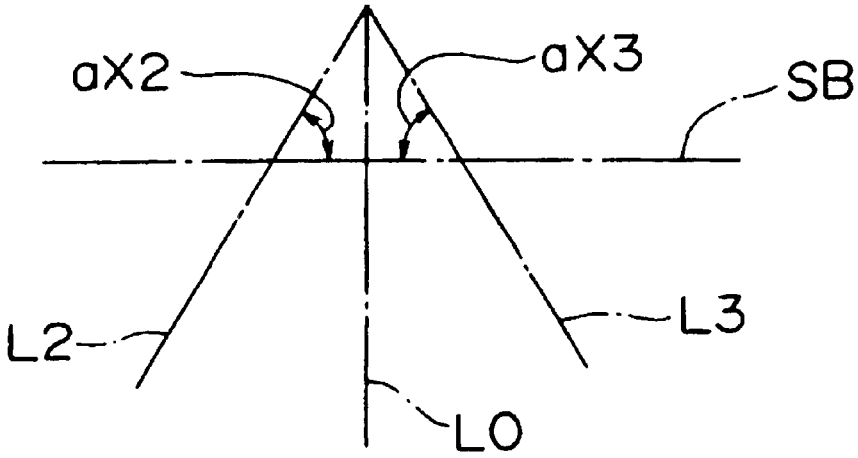
FIG. 6 is a projected view illustrating hole axes L2, L3 of nozzle holes H2, H3 projected onto a plane SX.
Figure 7:
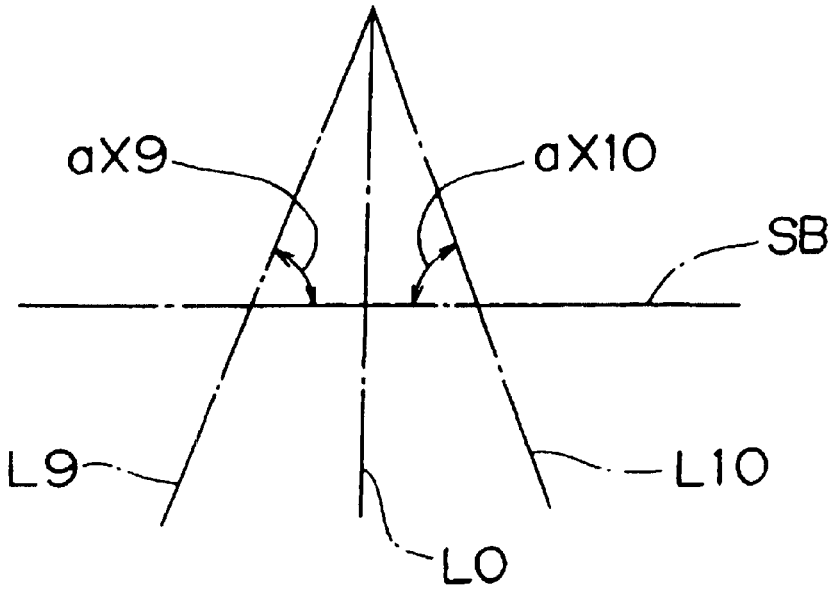
FIG. 7 is a projected view illustrating hole axes L9, L10 of nozzle holes H9, H10 projected onto the plane SX.
Figure 8:
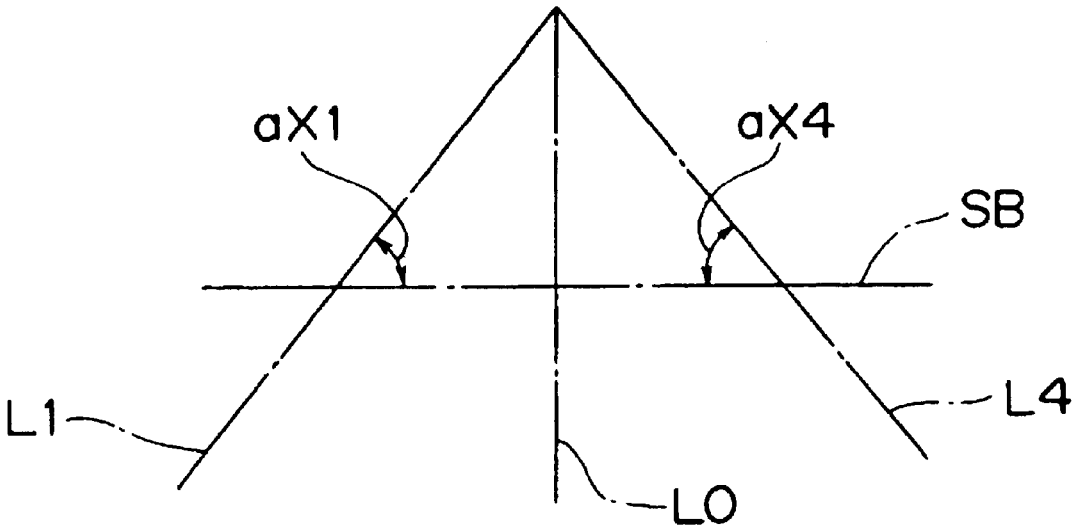
FIG. 8 is a projected view illustrating hole axes L1, L4 of nozzle holes H1, H4 projected onto the plane SX.

FIG. 3 is a projected view illustrating the hole axes L5, L4 of the nozzle holes H5, H4 projected onto a plane SY (FIG. 1). FIG. 4 is a projected view illustrating the hole axes L11, L10 of the nozzle holes H11, H10 projected onto the plane SY, and FIG. 5 is a projected view illustrating the hole axes L6, L3 of the nozzle holes H6, H3 projected onto the plane SY. FIG. 6 is a projected view illustrating the hole axes L2, L3 of the nozzle holes H2, H3 projected onto a plane SX (FIG. 1). FIG. 7 is a projected view illustrating the hole axes L9, L10 of the nozzle holes H9, H10 projected onto the plane SX, and FIG. 8 is a projected view illustrating the hole axes L1, L4 of the nozzle holes H1, H4 projected onto the plane SX. Referring now to FIGS. 3 through 8, respective acute angles will be defined as follows. The hole axis L5 projected onto the plane SY forms with the reference plane SB an acute angle aY5, the hole axis L4 projected onto the plane SY forms with the reference plane SB an acute angle aY4, the hole axis L11 projected onto the plane SY forms with the reference plane SB an acute angle aY11, the hole axis L10 projected onto the plane SY forms with the reference plane SB an acute angle aY10, the hole axis L6 projected onto the plane SY forms with the reference plane SB an acute angle aY6, and the hole axis L3 projected onto the plane SY forms with the reference plane SB an acute angle aY3. The hole axis L2 projected onto the plane SX forms with the reference plane SB an acute angle aX2, the hole axis L3 projected onto the plane SX forms with the reference plane SB an acute angle aX3, the hole axis L9 projected onto the plane SX forms with the reference plane SB an acute angle aX9, the hole axis L10 projected onto the plane SX forms with the reference plane SB an acute angle aX10, the hole axis L1 projected onto the plane SX forms with the reference plane SB an acute angle aX1, and the hole axis L4 projected onto the plane SX forms with the reference plane SB an acute angle aX4.

Figure 9:
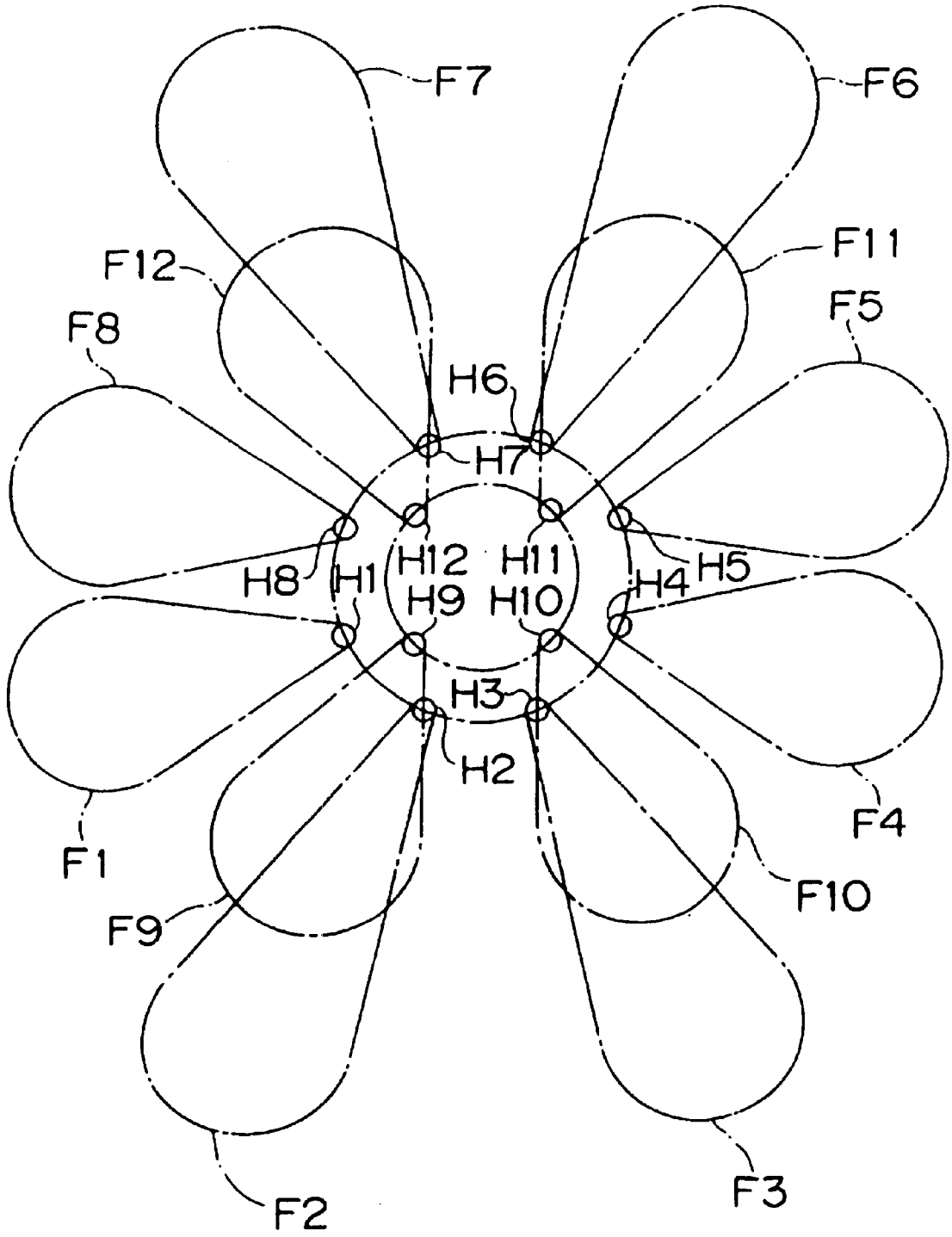
FIG. 9 is a schematic view illustrating a relationship between the nozzle holes formed in a fuel jet adjusting plate of a first embodiment and fuel sprays injected therethrough.

Since the fuel jet adjusting plate 1 of this embodiment is employed in an internal combustion engine of two intake valve type, the following relationships are established among the aforementioned acute angles: aY5=aY4<aY11=aY10<aY6=aY3; and aX9=aX10<aX2=aX3<aX1=aX4. That is, as illustrated in FIG. 9, the fuel sprays F7, F12, F8, F1, F9 and F2 correspond to intake air sucked through one intake valve, and the fuel sprays F6, F11, F5, F4, F10 and F3 correspond to intake air sucked through the other intake valve. FIG. 9 is a schematic view illustrating a relationship between the nozzle holes formed in the fuel jet adjusting plate of the first embodiment and the fuel sprays injected therethrough.

Figure 10:
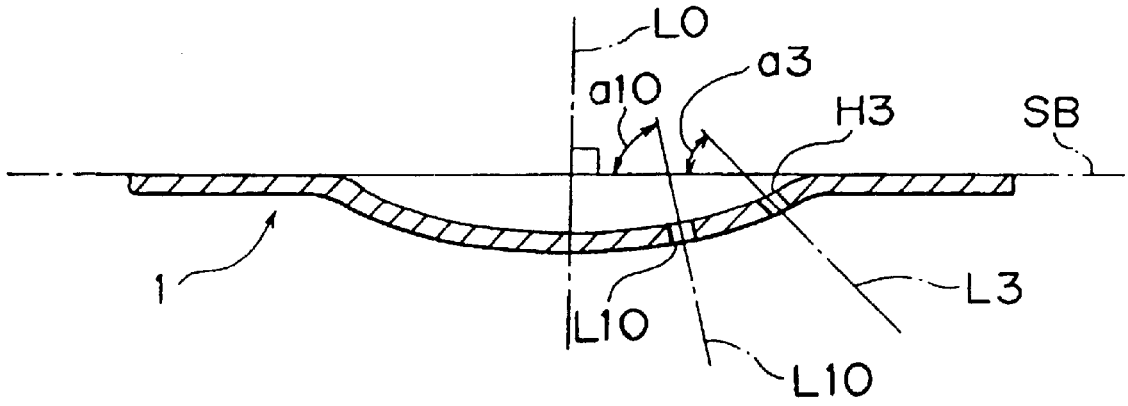
FIG. 10 is a sectional view similar to FIG. 2 according to a second embodiment of the present invention.

FIG. 10 is a sectional view similar to FIG. 2 according to a second embodiment of the present invention. As can be seen from FIG. 10, the fuel jet adjusting plate 1 of this embodiment has the shape of a bowl. As with the first embodiment, the acute angle a3 is smaller than the acute angle a10.

Figure 11:
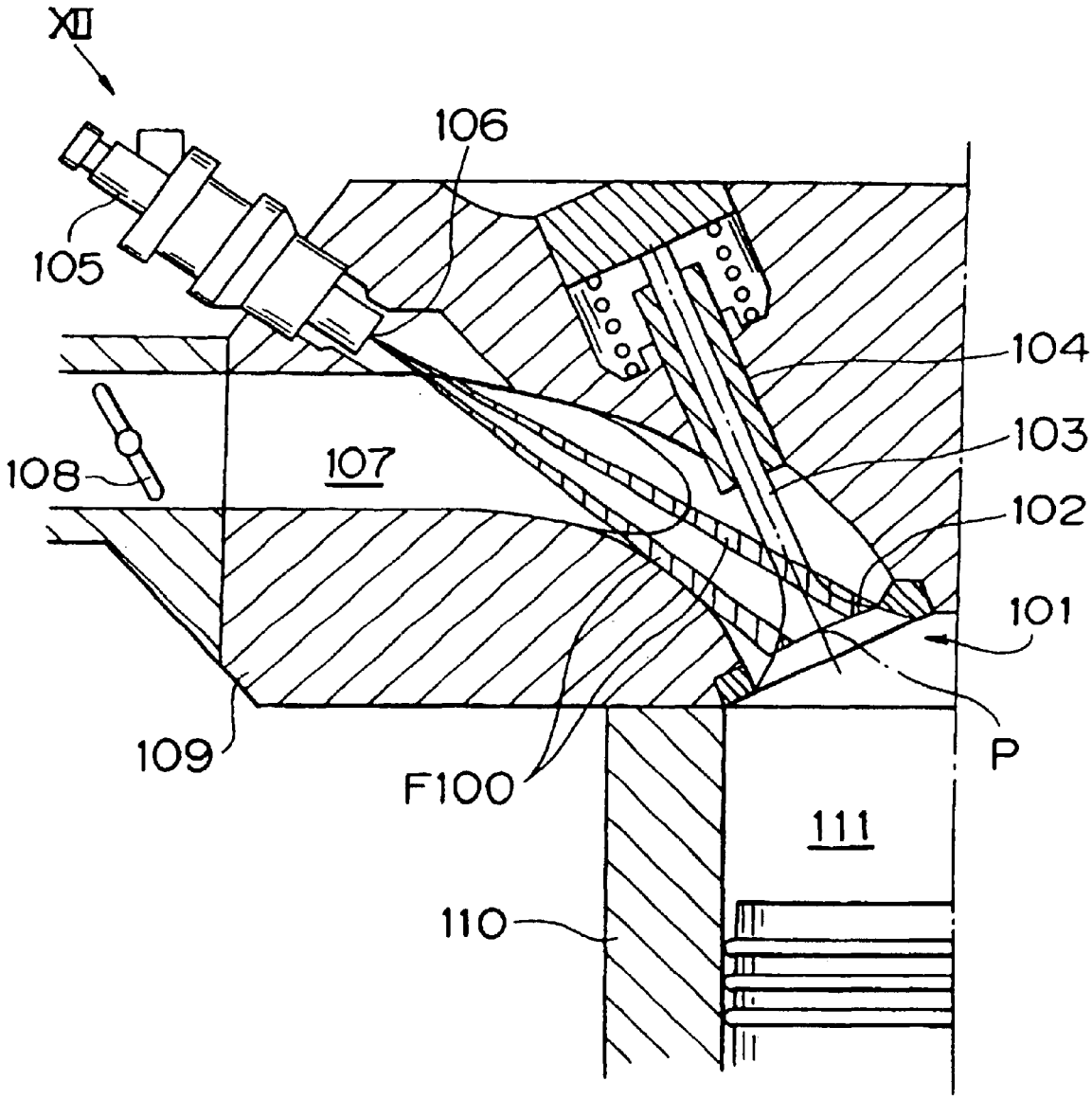
FIG. 11 is a partial side sectional view of the fuel injection valve for an internal combustion engine according to a third embodiment of the present invention.
Figure 12:
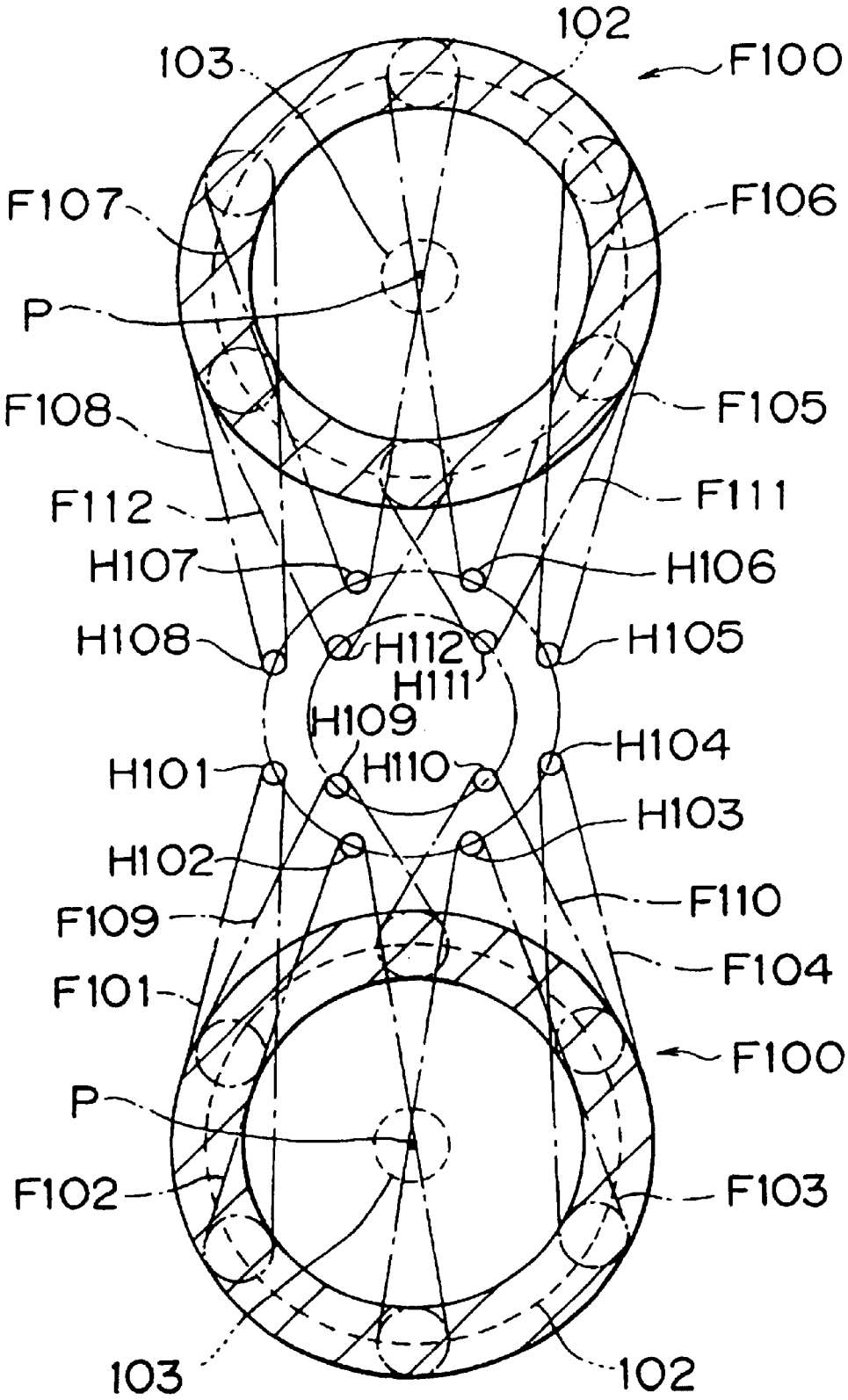
FIG. 12 is schematic view similar to FIG. 9 as viewed as indicated by an arrow in FIG. 11.

FIG. 11 is a partial side sectional view of the fuel injection valve according to a third embodiment of the present invention. FIG. 12 is a schematic view similar to FIG. 9 as viewed as indicated by an arrow in FIG. 11. Referring to FIGS. 11 and 12, reference character 101 denotes an intake valve, 102 a mushroom-shaped portion of the intake valve 101, 103 a stem of the intake valve 101, 104 a valve guide, 105 a fuel injection valve, and 106 a nozzle hole portion of the fuel injection valve 105. Reference character 107 denotes an intake port, 108 a throttle valve, 109 a cylinder head, 110 a cylinder block, 111 a combustion chamber, P a central portion of the mushroom-shaped portion 102, and F100 a fuel spray injected through the nozzle hole portion 106. In order to make the description easier to understand, the intake valve 101 as illustrated in FIG. 11 is closed. However, when fuel is injected from the fuel injection valve 105 and enters the combustion chamber 111 in the form of fuel spray, the intake valve 101 is actually opened. The fuel injection valve 105 may start injecting fuel at a timing at which the intake valve 101 is actually opened or starts moving toward its open position. However, in consideration of a time period necessary for fuel to reach the intake valve 101, the fuel injection valve 105 may start injecting fuel even before the intake valve 101 actually starts moving toward its open position. In this case, the aforementioned time period is set such that the fuel injected from the fuel injection valve 105 will reach the intake valve 101 at a timing at which the intake valve 101 actually assumes its open position. Furthermore, if within an allowable range, the fuel injection valve 105 may also start injecting fuel at such a timing that the fuel injected will reach the intake valve 101 even before the intake valve 101 starts moving toward its open position.

As can be seen from FIG. 12, the fuel injection valve 105 of this embodiment has, as is the case with the first and second embodiments, twelve nozzle holes H101 to H112. The nozzle holes H105 to H108, H111 and H112 are located on one side, and the nozzle holes H101 to H104, H109 and H110 are located on the other side. Fuel injected through the nozzle holes H105 to H108, H111 and H112 enters the combustion chamber via one intake valve (shown in an upper part of FIG. 12), whereas fuel injected through the nozzle holes H101 to H104, H109 and H110 enters the combustion chamber via the other intake valve (shown in a lower part of FIG. 12). Reference characters F101 to F112 denote fuel sprays injected from the nozzle holes H101 to H112 respectively.

The fuel injection valve 105 is set such that an entire fuel spray F100 injected through the respective nozzle holes H101 to H112 does not reach the central portion P or the stem 103 of the intake valve 101 but only an outer periphery of the mushroom-shaped portion 102. Since the fuel injected from the fuel injection valve does not adhere to the central portion P or the stem 103 of the intake valve 101, no delay is caused in supplying fuel to the combustion chamber. Hence, it is possible to improve response in a transient operating state of an internal combustion engine. This effect is significantly increased especially in a case where deposits or the like are attached to a surface of the mushroom-shaped portion 102.

Figure 13:
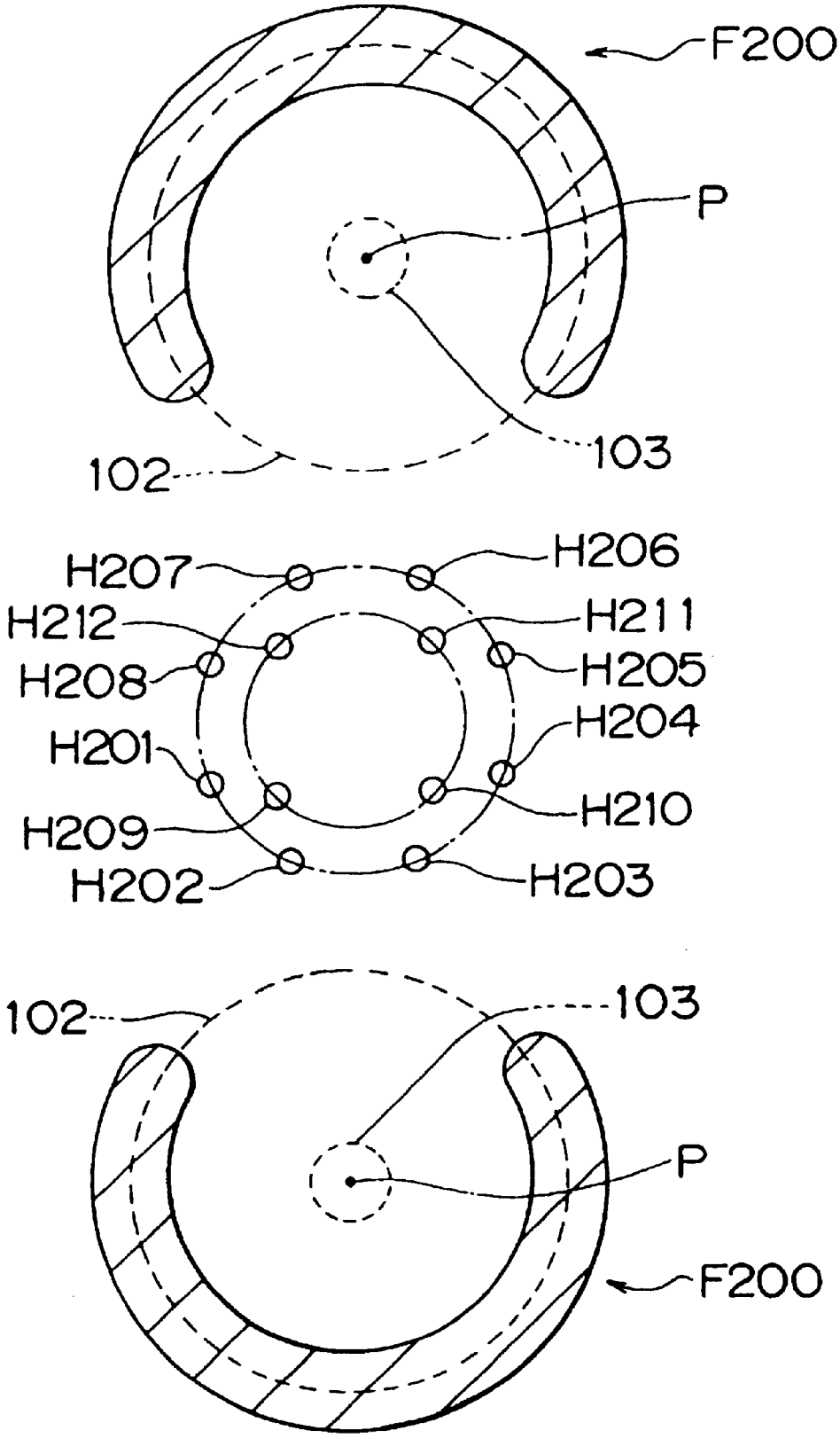
FIG. 13 is a schematic view similar to FIG. 12 illustrating the fuel injection valve for an internal combustion engine according to a fourth embodiment of the present invention.

FIG. 13 is a schematic view similar to FIG. 12 illustrating the fuel injection valve according to a fourth embodiment of the present invention. As can be seen from FIG. 13, the fuel injection valve 105 of this embodiment has, as is the case with the first through third embodiments, twelve nozzle holes H201 to H212. The nozzle holes H205 to H208, H211 and H212 are located on one side, and the nozzle holes H201 to H204, H209 and H210 are located on the other side. Fuel injected through the nozzle holes H205 to H208, H211 and H212 enters the combustion chamber via one intake valve (shown in an upper part of FIG. 13), whereas fuel injected through the nozzle holes H201 to H204, H209 and H210 enters the combustion chamber via the other intake valve (shown in a lower part of FIG. 13). In order to make the description easier to understand, fuel sprays injected through the nozzle holes 201 to 212 are not illustrated in FIG. 13.

As is the case with the second embodiment, an entire fuel spray F200 injected through the respective nozzle holes H201 to H212 does not reach the central portion P or the stem 103 of the intake valve 101 but only the outer periphery of the mushroom-shaped portion 102. Since the fuel injected from the fuel injection valve does not adhere to the central portion P or the stem 103 of the intake valve 101, no delay is caused in supplying fuel to the combustion chamber. Hence, it is possible to improve response in a transient operating state of an internal combustion engine. This effect is significantly increased especially in the case where deposits or the like are attached to the surface of the mushroom-shaped portion 102.

In addition, this embodiment is designed such that the fuel spray F200 certainly reaches the outer periphery portion of the mushroom-shaped portion 102 but does not reach a side thereof where an ignition plug is disposed (shown in a central part of FIG. 13). In this case, fuel is less densely distributed on the side of the ignition plug, whereby it is possible to preclude incomplete combustion.

Figure 14:
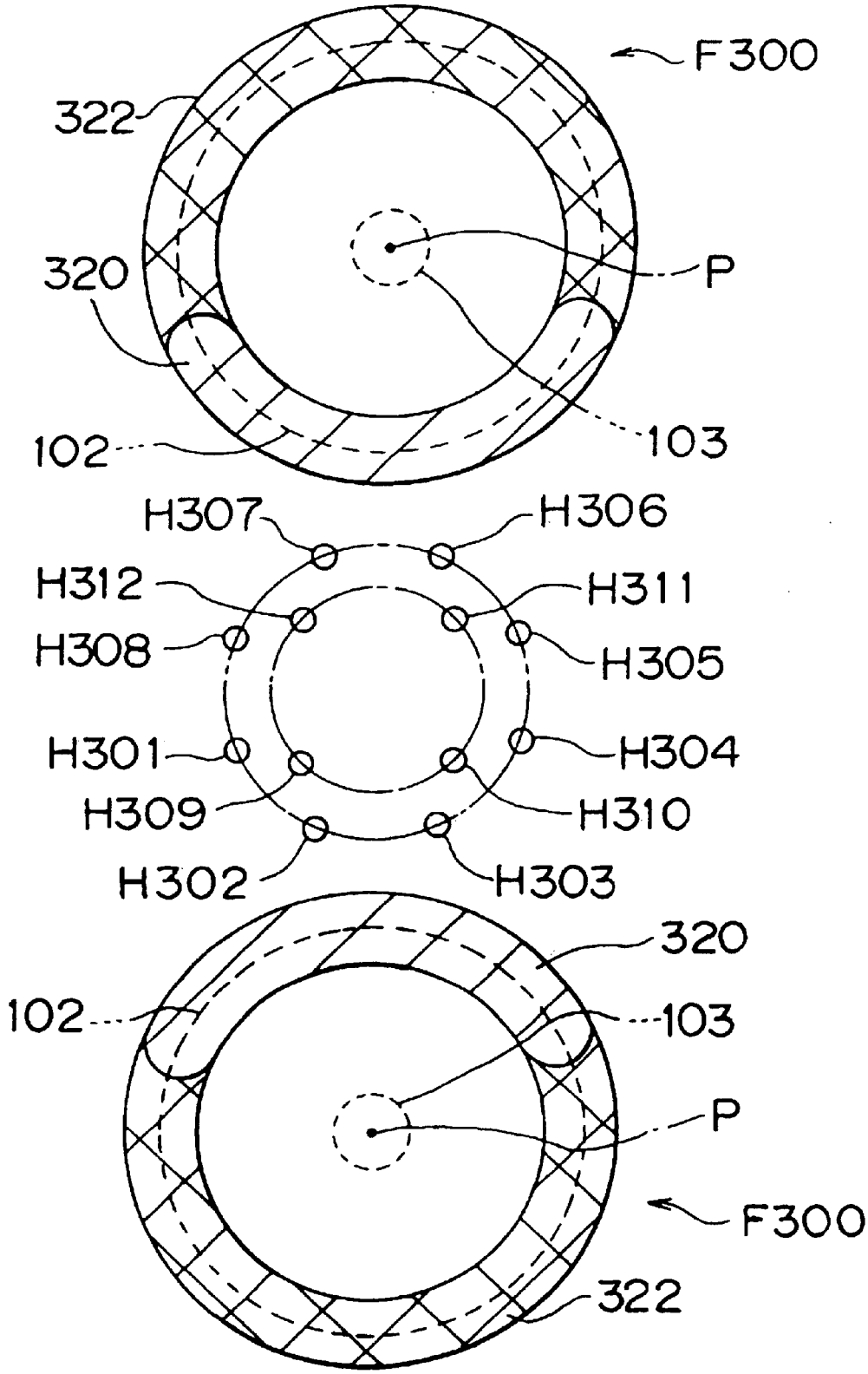
FIG. 14 is a schematic view similar to FIG. 12 illustrating the fuel injection valve for an internal combustion engine according to a fifth embodiment of the present invention.

FIG. 14 is a schematic view similar to FIG. 12 illustrating the fuel injection valve according to a fifth embodiment of the present invention. As can be seen from FIG. 14, the fuel injection valve 105 of this embodiment has, as is the case with the first through fourth embodiments, twelve nozzle holes H301 to H312. The nozzle holes H305 to H308, H311 and H312 are located on one side, and the nozzle holes H301 to H304, H309 and H310 are located on the other side. Fuel injected through the nozzle holes H305 to H308, H311 and H312 enters the combustion chamber via one intake valve (shown in an upper part of FIG. 14), whereas fuel injected through the nozzle holes H301 to H304, H309 and H310 enters the combustion chamber via the other intake valve (shown in a lower part of FIG. 14). In order to make the description easier to understand, fuel sprays injected through the nozzle holes 301 to 312 are not illustrated in FIG. 14.

As is the case with the third embodiment, an entire fuel spray F300 injected through the respective nozzle holes H301 to H312 does not reach the central portion P or the stem 103 of the intake valve 101 but only the outer periphery of the mushroom-shaped portion 102. Since the fuel injected from the fuel injection valve does not adhere to the central portion P or the stem 103 of the intake valve 101, no delay is caused in supplying fuel to the combustion chamber. Hence, it is possible to improve response in a transient operating state of an internal combustion engine. This effect is significantly increased especially in the case where deposits or the like are attached to the surface of the mushroom-shaped portion 102.

Furthermore, in this embodiment, the nozzle holes H309 to H312 have an opening area smaller than that of the nozzle holes H301 to H308 so that fuel entering the combustion chamber can be suitably distributed. Thus, fuel sprays (See FIG. 14) injected through the nozzle holes H309 to H312 exhibit a concentration in low concentration areas 320 lower than that of fuel sprays (See FIG. 14) injected through the nozzle holes H301 to H308 to high concentration areas 322. As a result, fuel is less densely distributed on the side of the ignition plug (shown in a central part of FIG. 14), whereby it is possible to preclude incomplete combustion.

Figure 15:
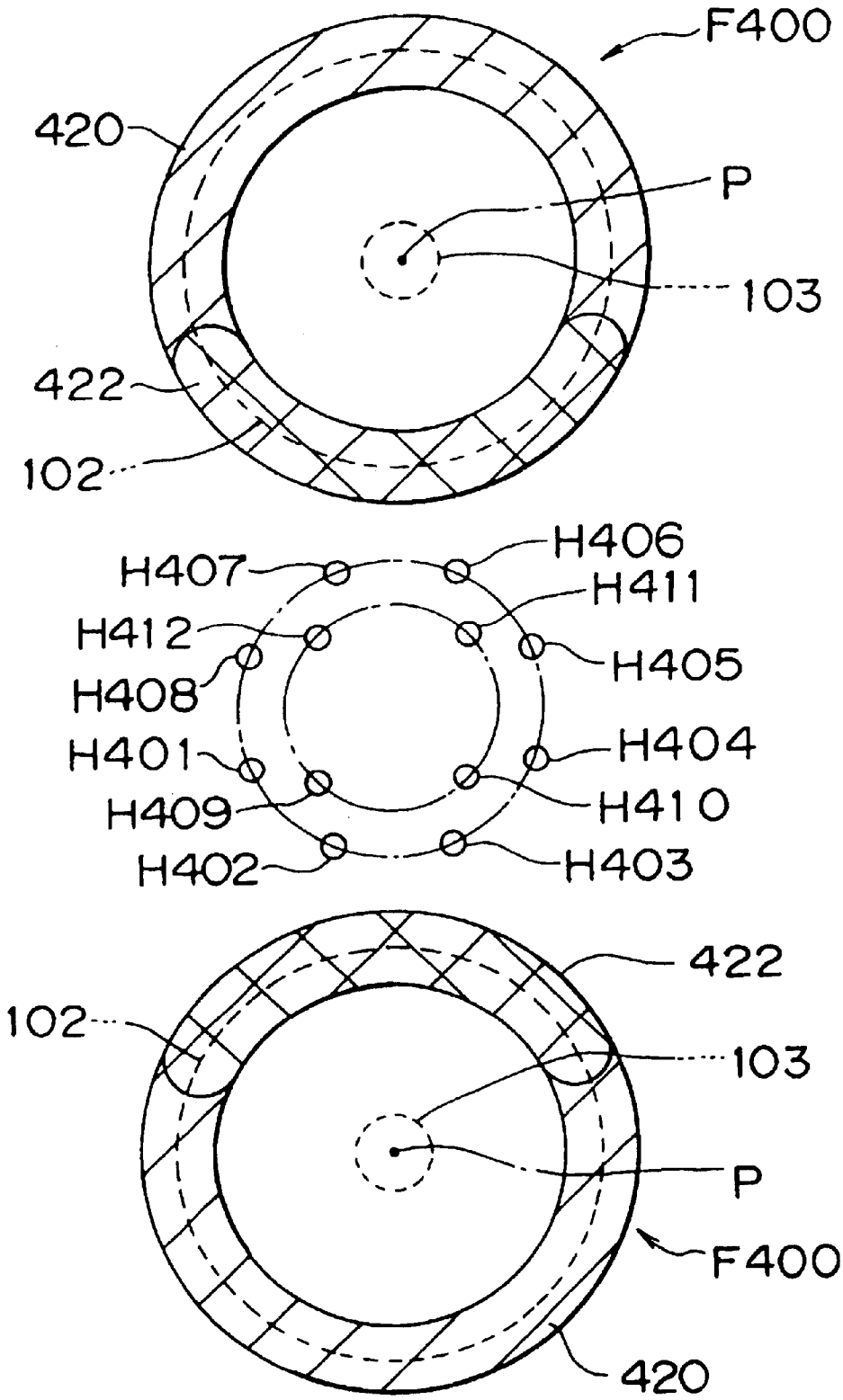
FIG. 15 is a schematic view similar to FIG. 12 illustrating the fuel injection valve for an internal combustion engine according to a sixth embodiment of the present invention.
Figure 16:
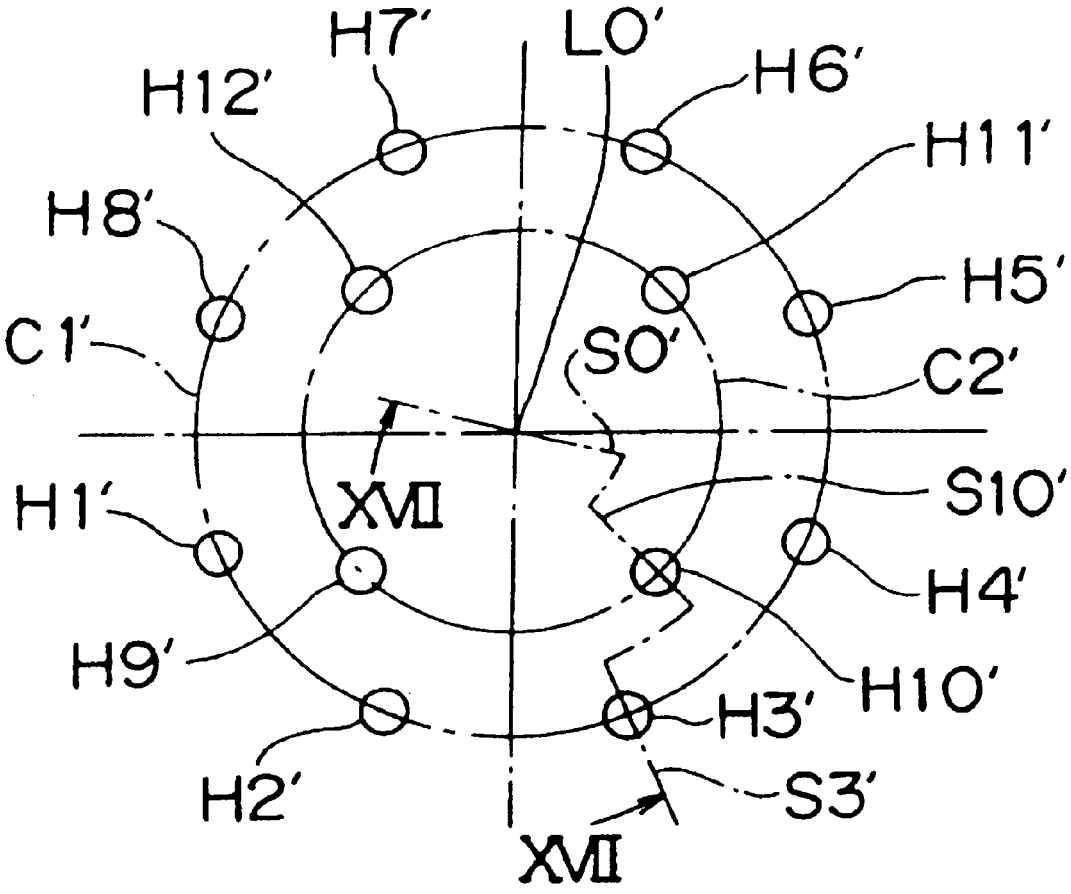
FIG. 16 RELATED ART
FIG. 16 is a partial plan view of a fuel jet adjusting plate of a conventional fuel injection plate for an internal combustion engine.
Figure 17:
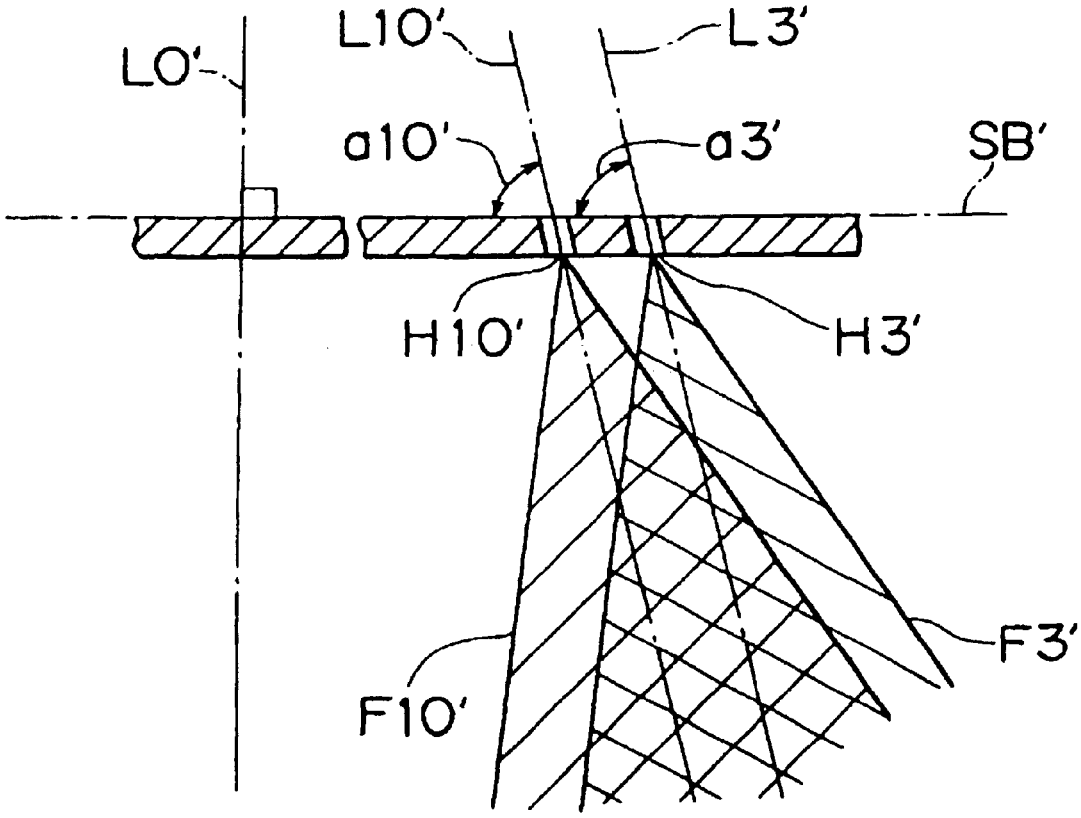
FIG. 17 RELATED ART
FIG. 17 is a sectional view taken along line XVII—XVII in FIG. 11.

FIG. 15 is a schematic view similar to FIG. 12 illustrating the fuel injection valve according to a sixth embodiment of the present invention. As can be seen from FIG. 15, the fuel injection valve 105 of this embodiment has, as is the case with the first through fifth embodiments, twelve nozzle holes H401 to H412. The nozzle holes H405 to H408, H411 and H412 are located on one side, and the nozzle holes H401 to H404, H409 and H410 are located on the other side. Fuel injected through the nozzle holes H405 to H408, H411 and H412 enters the combustion chamber via one intake valve (shown in an upper part of FIG. 15), whereas fuel injected through the nozzle holes H401 to H404, H409 and H410 enters the combustion chamber via the other intake valve (shown in a lower part of FIG. 15). In order to make the description easier to understand, fuel sprays injected through the nozzle holes 401 to 412 are not illustrated in FIG. 15.

As is the case with the third embodiment, an entire fuel spray F400 injected through the respective nozzle holes H401 to H412 does not reach the central portion P or the stem 103 of the intake valve 101 but only the outer periphery of the mushroom-shaped portion 102. Since the fuel injected from the fuel injection valve does not adhere to the central portion P or the stem 103 of the intake valve 101, no delay is caused in supplying fuel to the combustion chamber. Hence, it is possible to improve response in a transient operating state of an internal combustion engine. This effect is significantly increased especially in the case where deposits or the like are attached to the surface of the mushroom-shaped portion 102.

Furthermore, in this embodiment, the nozzle holes H409 to H412 have an opening area larger than that of the nozzle holes H401 to H408 so that fuel entering the combustion chamber can suitably be distributed. Thus, fuel sprays (See FIG. 15) injected through the nozzle holes H409 to H412 exhibit a concentration in high concentration areas 422 higher than that of fuel sprays (See FIG. 15) injected through the nozzle holes H401 to H408 to low concentration areas 420. As a result, fuel is more densely distributed on the side of the ignition plug (shown in a central part of FIG. 15), whereby it is possible to cause lean fuel to burn.

Although the aforementioned embodiments provide a fuel jet adjusting plate in which twelve nozzle holes are formed, the fuel jet adjusting plate may have any plural number of nozzle holes as long as they are arranged along a plurality of circles that are coaxial with each other.

While the present invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various element of the disclosed invention are shown in various combinations and configurations, which are exemplary, other combinations and configurations, including more, less or only a single element, are also within the spirit and scope of the invention.

What is claimed is:

1. A fuel injection valve for an internal combustion engine, comprising:

a valve body driven by driving means between an open position and a closed position;

a fuel jet adjusting plate for atomizing fuel injected when the valve body assumes the open position;

a plurality of first nozzle holes arranged along a first circle on said fuel jet adjusting plate, and coaxial with a central axis of the valve body; and a plurality of second nozzle holes arranged along a second circle concentric with the first circle and having a diameter larger than that of the first circle, wherein each of the second nozzle holes extends through the fuel jet adjusting plate along a respective second hole axis and wherein the second hole axes form corresponding second acute angles with a plane perpendicular to the central axis and wherein each of the first nozzle holes extends through the fuel jet adjusting plate along a respective first hole axis, the first hole axes forming a corresponding plurality of first acute angles with the plane perpendicular to the central axis and wherein the second acute angles are smaller than the first acute angles.

2. A fuel injection valve according to claim 1, wherein the fuel injection valve is mounted in an intake port of a cylinder to inject and atomize fuel so that the fuel reaches a combustion chamber of the cylinder at a timing at which an intake valve assumes its open position, the intake valve opening and closing the intake port of the cylinder to selectively permit intake air to enter the cylinder and wherein the fuel injection valve is positioned so that fuel sprays injected through the first and second nozzle holes do not reach a central portion of a mushroom-shaped portion of the intake valve but only an outer periphery of the mushroom-shaped portion.

3. The fuel injection valve according to claim 2, wherein the first nozzle holes have an opening area different from that of second nozzle holes.

4. A fuel injection valve for an internal combustion engine, comprising:

a valve body movable between an open position and a closed position;

a fuel jet adjusting plate including an upstream surface arranged in a first plane, the fuel jet adjusting plate atomizing fuel injected when the valve body assumes the open position; and a plurality of first nozzle holes along a first circle on the upstream surface of the fuel jet adjusting plate, and coaxial with a central axis of the valve body; and a plurality of second nozzle holes arranged along a second circle on the upstream surface of the fuel jet adjusting plate concentric with the first circle and having a diameter larger than that of the first circle, wherein each of the second nozzle holes extends through the fuel jet adjusting plate along a respective second hole axis and wherein the second hole axes form corresponding second acute angles with a plane perpendicular to the central axis and wherein each of the first nozzle holes extends through the fuel jet adjusting plate along a respective first hole axis, the first hole axes forming a corresponding plurality of first acute angles with the plane perpendicular to the central axis and wherein the second acute angles are smaller than the first acute angles.

5. The fuel injection valve according to claim 4, wherein the [firs] *first* plane is substantially perpendicular to the central axis.

6. The fuel injection valve according to claim 4, wherein the fuel injection valve is adapted for arrangement in a fuel passage for injection of a stream of fuel directly to a surface of an intake valve of a cylinder of an internal combustion engine.

* * * * *